United States Patent Office 3,109,527
Patented Nov. 5, 1963

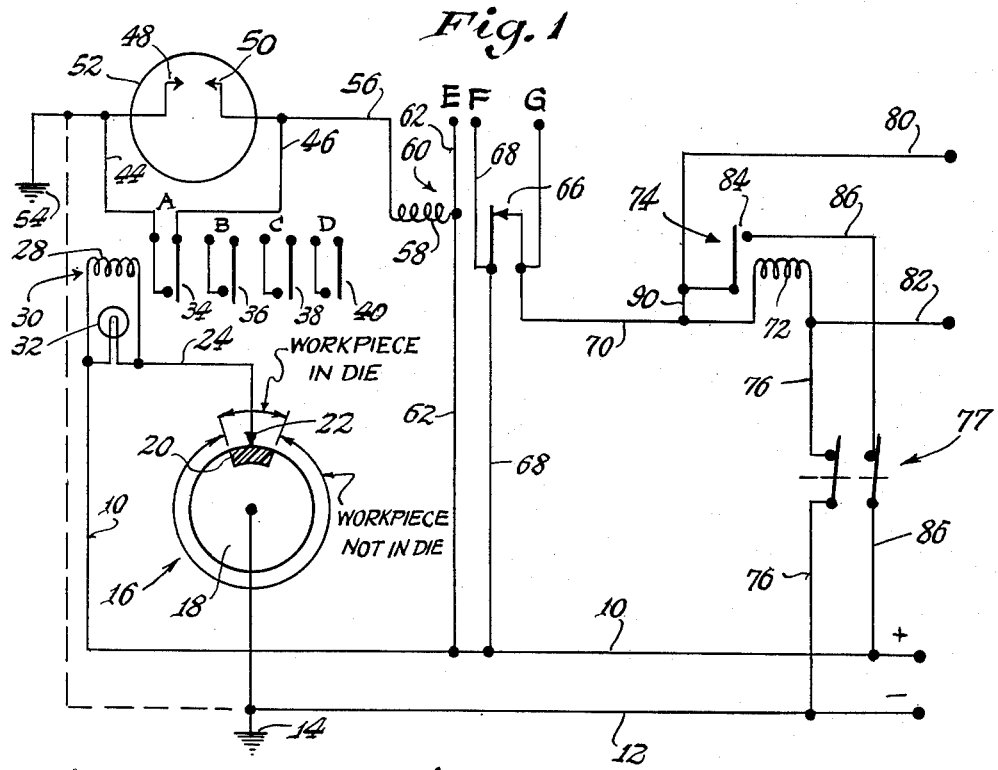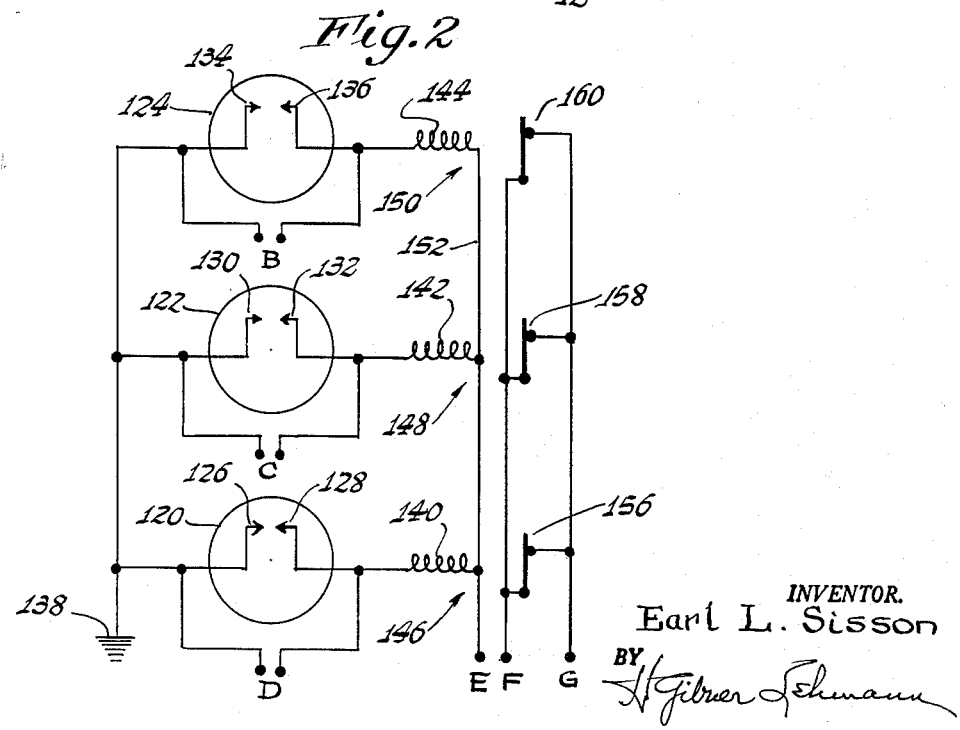

3,109,527
WORKPIECE-OPERATED MACHINE CONTROL
Earl L. Sisson, Stratford, Conn., assignor to Clark Metal Products, Inc., Fairfield, Conn., a corporation of Connecticut
Filed Feb. 20, 1961, Ser. No. 90,330
6 Claims. (Cl. 192—125)

This invention relates to workpiece-operated control devices which are adapted to shut-down machines of the type having a working stroke, such as presses and the like, and more particularly to control devices for this purpose which utilize electrical circuits arranged to be opened or closed in response to the presence or absence of workpieces at a predetermined point.

In the past various types of workpiece-controlled machine shut-down devices have been proposed and produced. Some are entirely automatic, whereas others are semi-automatic or operate to give a signal whereby the machine operator is apprised of the defect and may take appropriate action such as to clear jammed workpieces, halt the machine, etc. In many prior devices of this latter type a feeler or switch mechanism is utilized, being arranged for actuation by the workpieces. The intended normal actuation of such feeler or switch, indicating normal machine feed, etc., does not cause the signal to be given, and the latter is activated only when no actuation or else when improper actuation of the feeler or switch occurs due to the absence of the workpiece. In addition to providing a signal, some of these prior devices effect either from the signal or an equivalent circuit, a control so as to shut down the machine as by discontinuing the operating power, declutching and the like, whereby an automatic safety means is had.

Fully automatic control devices omitting the signal but otherwise operating along these lines are also well known. In general, such devices employ especially-constructed relays or the equivalent, of more or less complicated design to establish and maintain the power shut-off, in conjunction with special, somewhat complicated switch mechanisms which are adapted to respond to the presence or absence of the workpieces. The control circuits are likewise of special, generally complicated design. Where multiple die cavities or multiple machine operations are involved in these prior devices, the multiplicity of such special equipment undesirably and appreciably increased the cost of manufacture, retail sale price, etc.

Further, the utilization of especially-constructed relays, switching mechanisms and the like, had the effect of limiting the usefulness and adaptability of the control apparatus, whereby there was lost a flexibility in use, precluding universal application to different types of machinery.

The above drawbacks and disadvantages of prior devices of the general type identified are obviated by the present invention, and one object of the invention is to provide a novel and improved workpiece-operated machine shut-down device which utilizes, to the maximum possible extent, already existing and available components such as relays, switch mechanisms and the like, in order to effect the desired control, whereby reducing the fabricating cost as well as the necessity for special-purpose devices, special tooling requirements, etc.

A further object of the invention is to provide an improved workpiece-operated machine control as above set forth, which is relatively simple in its construction and arrangement, and which utilizes the fewest possible elements or components without sacrificing its usefulness.

A still further object of the invention is to provide an improved control apparatus as characterized, wherein a sensing of multiple die cavities or multiple machine operations may be readily carried out with the utilization of simple equipment or components which are readily available on the market, and which are required in small numbers, with duplication of components being avoided to the maximum possible degree.

A feature of the invention resides in the provision of an improved machine control apparatus having the above advantages and which is nevertheless foolproof and effective in its operation, and which incorporates the utmost reliability whereby the necessity for servicing is held to a minimum.

Another feature of the invention resides in the provision of an improved machine control as characterized, wherein those infrequent servicing operations which might be required are of the simplest nature and involve mostly simple checking and/or replacing of standard available components which may be stocked at little expense, thus resulting in the smallest possible down time for the machines involved.

Still another feature of the invention resides in the provision of a novel, electrical, machine-control apparatus wherein relatively simple circuits are involved, requiring a minimum amount of wires and cables, and wherein low voltages may be employed, reducing the likelihood of shock and occupational hazard.

A still further feature of the invention resides in the provision of an improved control apparatus as above set forth, wherein the response is extremely rapid and the response time correspondingly short, thereby minimizing any likelihood of damage to the machine, loss of production, spoiled workpieces, die tools and the like.

Another object of the invention is to provide, for a machine of the type having a working stroke, an improved machine-control apparatus which incorporates an electrical interrupter-type switch driven in synchronism with the machine stroke and wherein there is a novel combination utilizing a relay and associated holding circuit, to permanently effect shut-down of the machine until such time that it is intentionally started.

Other features and advantages will hereinafter appear.

In the accompanying drawings, illustrating one embodiment of the invention:

FIG. 1 is a schematic circuit diagram of the improved workpiece-operated machine control device, arranged to be responsive to the presence or absence of workpieces in a single die or at a single operation-performing station of the machine.

FIG. 2 is a schematic circuit diagram which is supplemental to the diagram of FIG. 1 and which illustrates additional dies or work-performing stations and additional workpiece-operated switch mechanisms by which a plurality of operations may be sensed or monitored. Related terminals appearing in FIGS. 1 and 2 have been given like letters, indicating that they are to be connected together to extend the single sensing arrangement of FIG. 1 so as to embrace multiple sensing elements or switches.

Considering now FIG. 1, power supply means or leads 10 and 12 are shown, arranged to be energized from a suitable electrical source such as a low voltage rectified D.C. supply unit. Connected with the supply wire 12 (which may be the negative side of the line, grounded at 14) is an interrupter switch 16, shown as being of the rotary type comprising a conductive disk or wheel 18 having a small insulating segment 20, in conjunction with a brush 22 by which the supply current brought to a wire 24 connected with the brush, may be repeatedly interrupted.

Preferably, as shown, the insulating segment 20 constitutes a small fractional part of the circumference of the disk or wheel 18 and represents a dwell interval of small duration, corresponding to the time that a workpiece is occupying the die or other work performing station of the machine which is to be controlled. Therefore, the conductive portion 18 of the switch corresponds to a duration of time representing an interval during which, for normal operation, no workpiece is in the machine die or at the operation-performing station.

The switch 16 is coupled to the drive shaft or other suitable powered member of the machine so as to be turned in synchronism with the machine cycle, whereby each interval during which the brush 22 is engaged with the insulating segment 20 corresponds to the time that a workpiece is required to be present for the performance of operations thereon.

Connected with the supply wire 24 is a coil 28 of a relay 30, such coil being also connected with the supply wire 10 as shown. A pilot or indicator light 32 bridges the coil 28 so as to be energized concurrently therewith. By such organization the relay coil 28 and light 32 will be repeatedly energized and de-energized in synchronism with the working stroke of the machine.

The continuous blinking of the pilot light 32 will indicate to the operator that the portion of the apparatus comprising the power supply, interrupter switch 16 and circuit connected therewith is in normal, operative condition.

The relay 30 is shown as having a plurality of sets of contacts 34, 36, 38 and 40 all of which are normally open-circuited when the relay coil 28 is de-energized, and which become close-circuited upon energization of such coil.

While in FIG. 1 the relay 30 is shown as having four sets of contacts, it may have a greater or lesser number, depending on the number of dies or operations which are to be monitored. The reason for four sets of contacts being shown in FIG. 1 is that, by adding the circuit of FIG. 2 which shows three additional dies to FIG. 1 there results a control apparatus involving four dies or operation-performing stations. Where but a single die or operation-performing station is required, only the set of relay contacts 34 need be utilized. However, a feature of the invention resides in an arrangement where but a single relay 30 may be utilized, and where additional sensing operations may be taken care of merely by the use of additional relay contacts without requiring separate relays.

The relay contacts 34 are connected by wires 44 and 46 so as to bridge or shunt sensing contacts 48, 50 provided in a machine die (indicated diagrammatically by the circle 52) or at a similar operation-performing station. The sensing contacts 48, 50 are arranged to be actuated or bridged by a workpiece which is present in such die (or at such station), thereby to close a circuit which shunts the relay contacts 34. The said circuit may include a ground connection 54 and also a wire 56 which is connected to the coil 58 of a control relay 60 (hereinafter also referred to as a "first" relay). The coil 58 is in turn connected by a wire 62 to the supply wire 10.

By such organization, closing of the circuit through the relay coil 58 is effected whenever either the relay contacts 34 are closed or else when the sensing contacts 48, 50 are closed or connected, or else when both these conditions occur. This latter situation exists only momentarily, at the time that the sensing contacts 48, 50 are being closed and the relay contacts 34 are being opened and also at the time that the sensing contacts 48, 50 are being opened and the relay contacts 34 are being closed. An overlap in the action of these contacts is provided for by the invention, in order that normally the relay coil 58 will remain fully energized at all times, without any break occurring in its energization, provided that workpieces are delivered at the proper times and in unbroken succession to the die 52 or at the other work performing station of the machine as the latter is in operation.

However, if at any time a workpiece should be absent from the die 52 at the time that its presence is required (corresponding to the interval when the brush 22 of the interrupter 16 is being traversed by the insulating segment 20) the energization of the relay coil 58 will be discontinued, and such action is utilized, by the present invention, to operate a control by which the machine is halted so that the trouble can be remedied before damage occurs or loss of production time.

Referring again to FIG. 1, the "first" control relay 60 has a set of normally closed contacts 66 (when the coil 58 is unenergized) which are arranged to be open at all times that the relay is energized as a consequence of proper feeding of workpieces to the die 52.

By the present invention, a novel advantageous and simplified control organization is provided, characterized by two control relays in a unique combination, one of such relays being the said "first" relay 60. In effecting this, the "first" control relay 60 is connected to influence a "second" control relay means for the purpose of controlling the power circuit or clutch circuit of the machine and also to provide a simple holding means by which such circuit, having been once made operative, will be maintained in such condition regardless of subsequent reclosing of the sensing circuit and sensing contacts, and regardless of subsequent re-energization of the "first" control relay 60.

For this purpose, a wire 68 connects the contacts 66 with the supply line 10, and a wire 70 connects the contacts 66 to the coil 72 of a "second" control relay 74. The coil 72 of the "second" relay 74 is connected by a wire 76 (through a novel switch control means 77 later described in detail) with the supply lead 12, thus to effect an energization of the coil when the relay contacts 66 of the "first" relay become closed due to failure of a workpiece to be present at the die 52. It will be understood that such failure results in de-energization of the relay coil 58, and consequent closing of the relay contacts 66.

The resultant energization of the relay coil 72 is utilized to influence a control circuit comprising wires 80 and 82. The wire 82 is connected to the wire 76 joined to the supply lead 12, and the wire 80 is connected to normally open contacts 84 of the relay 74, such contacts being also connected, in accordance with the invention, by a wire 86 through the normally closed novel switch control means 77 (which comprises a pair of coupled, manually operable reset switches), to the supply lead 10. By such organization, with the reset switch means 77 closed, the control wires 80, 82 will receive energization from the supply lines 10, 12 whenever the relay contacts 84 close in response to energization of the coil 72 of the "second" control relay. Such energization is always under the control of the normally closed, manually operable reset switch 77, as thus connected.

Thus, the absence of a workpiece in the die 52 will result in de-energization of the "first" control relay 60 and consequent energization of the "second" control relay 74 whereby the control circuit comprising the wires 80, 82 will be energized from the supply, and this condition may be utilized in conjunction with suitable well-known switching and relay means to effect a shutdown of the machine, either by declutching and braking, or shutdown of power, or both.

By the present invention, the "second" control relay 74 having but the single set of contacts 84 functions not only to energize the control wires 80, 82 but also to effect a continuance of such energization even though the energization of the coil 72 from the relay contacts 66 is discontinued as a consequence of re-energization of the "first" control relay 60 for any reason, as by the presence of a succeeding workpiece in the die 52 following the absence of a workpiece. In accomplishing this, a novel and simplified multi-function holding circuit is provided in conjunction with the circuitry connected to the "second" control relay 74. The said holding circuit comprises a wire 90 which joins the wire 80 to the wire 70.

It will now be seen that once the relay coil 72 of the "second" control relay has been energized, closing the contacts 84, continuance of such energization will be automatically effected by virtue of the said holding circuit, since (regardless of subsequent opening of the relay contacts 66) power will be brought to the coil 72 through the wires 76, 70, 90, 80, relay contacts 84, wire 86 and normally closed reset switches 77. Such holding or continuance of energization of the coil 72 and of the control wires 80, 82 is effected in the simplest possible manner, utilizing the single set of relay contacts 84 which also brings power to the control wires 80, 82 when the initial fault occurs at the die 52. Thus, additional relays and sensing contacts, separate holding contacts and the like are not required in order to continue the automatic, power or machine shut-down as a consequence of a fault occurring at the die 52, and this is an important feature of the invention.

After the fault has been corrected at the die 52, power may be re-established to the machine by re-setting the apparatus, this being accomplished by merely actuating the reset switches 77 to open the circuit through the wires 76 and 86 and to release the holding contacts 84.

By the present invention, the control circuit and organization shown in FIG. 1 has utility in effecting a multiplicity of sensing operations, and this may be accomplished or achieved by utilization of a minimum number of additional components, with a minimum amount of duplication. For example, no duplication of the "second" control relay 74 is required, nor any duplication of the coil 28 of the relay 30. The additional needed components involved are additional sensing switches and additional "first" control relays similar to the relay 60.

For the above purpose, referring to FIG. 1, the wire 62 is connected to a terminal E, the wire 68 connected to a terminal F, and the wire 70 connected to a terminal G, as shown, the purpose of these connections being described in detail below. In considering FIG. 2, the terminal points marked E, F and G are to be connected respectively to the correspondingly lettered terminal points of FIG. 1. Also, the terminals B, C and D in FIG. 2 are to be connected respectively to the sets of relay contacts 36, 38 and 40 in FIG. 1, which have been correspondingly lettered.

In FIG. 2 the additional dies or operation-performing stations 120, 122 and 124 are provided with sets of sensing contacts 126 through 136. These sets are connected to a common ground 138 as shown, and also connected respectively to the coils 140, 142 and 144 of additional "first" relays 146, 148, and 150. The coils 140, 142 and 144 are joined to a common wire 152 which leads to the terminal E. The relays 146, 148 and 150 have sets of normally closed contacts 156, 158 and 160, the said sets being connected in parallel or shunt and joined as shown to the terminals F and G.

It will be seen from the foregoing that the sets of relay contacts 66, 156, 158 and 160 are all connected in parallel whereby closing of any one set of contacts due to the absence of a workpiece in any one of the dies 52, 120, 122 or 124 will result in energization of the relay coil 72, thereby to energize the control circuit 80, 82 and shut down the machine. The operation of the additional sensing contacts and additional relays shown in FIG. 2 follows exactly that described above in connection with the sensing contacts 48, 50 and the "first" relay 60 of FIG. 1.

The double switch device 77 is an important feature, since both leads of the coil 72 are opened, effecting an independence with regard to the condition of the contacts 66, 156, 158 and 160 whereby these cannot interfere in any manner with the reset operation and de-energization of the relay coil 72.

It will now be understood from the foregoing that I have provided, in accordance with the invention, a novel and simplified workpiece-operated machine control apparatus which utilizes mainly components or parts which are not of special construction and which may be readily obtained as equipment available on the market. Single contact and multiple contact relays, having either normally open or normally closed contacts are well known and currently available. Thus, components which may come under the heading of "special" would only be the rotary interrupter switch 16, of which only one is required, and the sets of sensing contacts associated with dies, which are of the simplest possible construction involving a relatively small expenditure.

The operation is briefly reviewed as follows: With the interrupter switch 16 turning in synchronism with the machine it will effect energization of the relay coils 28 and 58 except when workpieces are intended to be in the dies 52, 120, 122 and 124. The presence of workpieces in all such dies will continue the energization of the relay coil 58 during the intervals that such energization is not supplied by the relay contacts 34–40 (influenced by the coil 28). Thus the open relay contacts 66, 156, 158 and 160 will not for this condition effect energization of the relay coil 72. However, absence of a workpiece in any die will release the associated "first" relay, causing its contacts to then effect energization of the relay 74, thereby resulting in the control circuit 80, 82 being energized, and causing a continuance of energization of the "second" relay 74, halting the machine. Actuation of the reset switch device 77 de-energizes the second relay 72 to restore the normal condition of the control.

The above simplified control apparatus is reliable in its operation and not susceptible to failure under ordinary conditions of use. Servicing of the apparatus may be simply effected, and faulty components may be easily replaced by spares which can be either kept on hand or else readily purchased on the market.

Variations and modifications may be made within the scope of the claims, and portions of the improvements may be used without others.

I claim:

1. A workpiece-operated control device for shutting down a machine of the type having a working stroke, comprising a control circuit; an electric supply means; a continuously operable interrupter switch means connected with said supply means and adapted for driving mechanical connection to the machine to effect cyclic opening and closing intervals of the control circuit in synchronism with the working stroke of the machine; a workpiece-actuated switch means shunted across the interrupter switch means and adapted to be actuated by a workpiece disposed at a pre-determinate place in the machine; a first control relay having contacts connected to said supply means and having a coil connected in said control circuit, for control by both said switch means, said relay contacts being open when the relay coil is energized; a second control relay having contacts and having a coil connected with the contacts of the first control relay and with the said supply means for energization from the latter, said contacts of the said second relay being closed when the coil of said second relay is energized; a second control circuit for effecting shutting down of the machine, connected to the contacts of the second control relay and to the supply means whereby energization of the second control relay coil shuts down the machine; and a holding circuit means connected with the coil and contacts of the second control relay to maintain the energization of the latter after it has been initially energized, thereby to completely inactivate the machine when the second control relay and the holding circuit are operative.

2. A control device as in claim 1, in which the interrupter switch means includes a make-and-break switch and means for coupling the same to the machine, and includes a rapid-response relay having a coil connected to said supply means and to said make-and-break switch.

3. A control device as in claim 1, in which there is a manually operable reset switch means for de-energizing the coil of the second control relay, thereby to render inoperative the said holding circuit.

4. A control device as in claim 1, in which there are additional workpiece-actuated switch means, in which the interrupter switch means comprises a plurality of switches respectively shunted by the workpiece-actuated switch means, and in which there are additional relays having coils connected respectively to said additional workpiece-actuated switch means, said additional relays having contacts shunted with each other and with the contacts of the said first control relay whereby shut-down of the machine may be effected by the absence of additional workpieces.

5. A control device as in claim 2, in which there are additional workpiece-actuated switch means, in which the rapid response relay has multiple sets of contacts respectively shunted by the workpiece-actuated switch means, and in which there are additional relays having coils connected respectively to said additional workpiece-actuated switch means, said additional relays having contacts shunted with each other and with the contacts of the said first control relay.

6. A control device as in claim 1, in which the intervals of open-circuit of the interrupter switch means have a duration constituting a small fractional part of the duration of the closed-circuit intervals of the interrupter switch means.

References Cited in the file of this patent

UNITED STATES PATENTS 2,317,839     Westin _____ Apr. 27, 1943